US009086006B2

(12) United States Patent
Herrmann et al.

(10) Patent No.: US 9,086,006 B2
(45) Date of Patent: Jul. 21, 2015

(54) VALVE DEVICE FOR INTERNAL COMBUSTION ENGINES

(75) Inventors: Berthold Herrmann, Neuss (DE); Holger Paffrath, Pulheim (DE); Peter Burgfels, Juechen (DE)

(73) Assignee: PIERBURG GMBH, Neuss (DE)

( * ) Notice: Subject to any disclaimer, the term of this patent is extended or adjusted under 35 U.S.C. 154(b) by 163 days.

(21) Appl. No.: 13/516,237

(22) PCT Filed: Nov. 26, 2010

(86) PCT No.: PCT/EP2010/068303
§ 371 (c)(1),
(2), (4) Date: Aug. 21, 2012

(87) PCT Pub. No.: WO2011/082887
PCT Pub. Date: Jul. 14, 2011

(65) Prior Publication Data
US 2012/0318217 A1    Dec. 20, 2012

(30) Foreign Application Priority Data

Dec. 17, 2009    (DE) .......................... 10 2009 058 930

(51) Int. Cl.
*F16K 31/02*    (2006.01)
*F01N 3/22*    (2006.01)

(52) U.S. Cl.
CPC .................. *F01N 3/22* (2013.01); *F01N 3/222* (2013.01); *F01N 2560/08* (2013.01)

(58) Field of Classification Search
CPC ........ F16K 37/0091; F16K 31/02; F01L 9/04; F01L 1/00; G01L 7/00; G01L 19/0007; G01L 19/0061; G01L 19/0038; G01L 19/083; G01L 19/147

USPC ................. 137/487.5, 557; 73/700, 715, 756; 251/129.01, 129.04; 123/90.11
See application file for complete search history.

(56) References Cited

U.S. PATENT DOCUMENTS

| 4,898,035 | A * | 2/1990 | Yajima et al. .................... 73/727 |
| 5,925,826 | A * | 7/1999 | Kodama et al. ................. 73/726 |
| 6,367,334 | B2 * | 4/2002 | Wade et al. ...................... 73/756 |
| 6,688,181 | B1 * | 2/2004 | Clerc et al. ...................... 73/715 |

(Continued)

FOREIGN PATENT DOCUMENTS

| DE | 197 52 977 A1 | 2/1999 |
| DE | 10 2005 011 884 A1 | 11/2005 |

(Continued)

*Primary Examiner* — Craig Schneider
*Assistant Examiner* — Minh Le
(74) *Attorney, Agent, or Firm* — Norman B. Thot

(57) ABSTRACT

A valve device for an internal combustion engine includes a drive unit. A drive housing in which the drive unit is arranged. A valve unit is configured to be moved by the drive unit. The valve unit comprises a valve rod and a valve closure member. A flow housing comprises a fluid inlet channel and a fluid outlet channel. A connection cross section of the fluid inlet channel and the fluid outlet channel is configured to be controlled by the valve closure member. A pressure detection chamber is fluidically connected with the fluid inlet channel. A pressure sensor is arranged in the pressure detection chamber and is integrated in the drive housing. The pressure sensor comprises a pressure detection surface arranged in a plane. A normal of the pressure detection surface is arranged so as to be perpendicular to a direction of a fluid flow into the pressure detection chamber.

18 Claims, 2 Drawing Sheets

(56) References Cited

U.S. PATENT DOCUMENTS

| | | | |
|---|---|---|---|
| 7,284,514 B2 * | 10/2007 | Grider | 123/90.15 |
| 7,562,580 B2 * | 7/2009 | Rezgui et al. | 73/716 |
| 7,950,413 B2 * | 5/2011 | Fleischer et al. | 137/487.5 |
| 8,408,516 B2 * | 4/2013 | Dlugoss | 251/129.04 |
| 2001/0023616 A1 * | 9/2001 | Wade et al. | 73/756 |
| 2003/0230636 A1 * | 12/2003 | Rogers | 239/71 |
| 2005/0076956 A1 * | 4/2005 | Frederiksen | 137/557 |
| 2005/0204732 A1 | 9/2005 | Kouzu et al. | |
| 2005/0274367 A1 * | 12/2005 | Malone et al. | 123/568.18 |
| 2006/0054220 A1 * | 3/2006 | Hatanaka | 137/557 |
| 2007/0277590 A1 | 12/2007 | Wilde | |
| 2008/0110159 A1 | 5/2008 | Komiyama et al. | |
| 2008/0115844 A1 * | 5/2008 | Teichmann et al. | 137/557 |
| 2008/0265190 A1 * | 10/2008 | Fleischer et al. | 251/65 |
| 2009/0189101 A1 * | 7/2009 | Takeda et al. | 251/129.01 |
| 2009/0229583 A1 * | 9/2009 | Kotooka et al. | 123/568.18 |
| 2010/0218833 A1 * | 9/2010 | Bush | 137/557 |

FOREIGN PATENT DOCUMENTS

| | | |
|---|---|---|
| DE | 10 2007 000 900 A1 | 5/2008 |
| JP | 2001-194255 A | 7/2001 |
| JP | 2005-265482 A | 9/2005 |
| JP | 2007-529727 A | 10/2007 |
| JP | 2008-122329 A | 5/2008 |
| JP | 2008-528897 A | 7/2008 |

* cited by examiner

VALVE DEVICE FOR INTERNAL COMBUSTION ENGINES

CROSS REFERENCE TO PRIOR APPLICATIONS

This application is a U.S. National Phase application under 35 U.S.C. §371 of International Application No. PCT/EP2010/068303, filed on Nov. 26, 2010 and which claims benefit to German Patent Application No. 10 2009 058 930.9, filed on Dec. 17, 2009. The International Application was published in German on Jul. 14, 2011 as WO 2011/082887 A1 under PCT Article 21(2).

FIELD

The present invention provides a valve device for internal combustion engines comprising a drive unit, a drive housing in which the drive unit is disposed, a valve unit movable by means of the drive unit, formed at least by a valve rod and a valve closure member, a flow housing with a fluid inlet channel and a fluid outlet channel, the cross section of their connection being controllable by means of the valve closure member, a pressure detection chamber fluidically connected with the fluid inlet channel, and a pressure sensor arranged in the pressure detection chamber.

BACKGROUND

Such valve devices are known, for example, from the context of secondary air supply for the control of the volume of secondary air introduced into the exhaust gas system, whereby the pollutant emissions in the exhaust gases of the internal combustion engine can be reduced by the oxidization of non-combusted hydrocarbons. These valves comprise a valve, often actuated electromechanically, by means of which the amount of air is regulated, as well as a check valve which prevents a reverse flow of exhaust gases towards the secondary air pump due to exhaust gas pulsations. For a detection of malfunctions of the secondary air pump or for the control of the secondary air supply, it is known to arrange a pressure sensor in the channel leading to the valve device. However, this sensor requires additional electric connections and additional structural space.

In an attempt to solve this problem, DE 10 2005 011 884 A1 describes a valve device for a secondary air supply system in which a secondary air pump introduces secondary air into an exhaust gas pipe at a point upstream of a catalytic converter in order to accelerate the heating and the activation of the catalytic converter. A valve device is provided between the secondary air pump and the exhaust gas pipe, which valve device comprises a fluid inlet channel and a fluid outlet channel that is connected with the exhaust gas pipe, the amount of air flowing from the fluid inlet channel to the fluid outlet channel being dependent on the position of the valve. For a reduction of structural space, the pressure sensor of this embodiment is arranged above the electromagnet of the valve. The connection of the pressure detection chamber, in which the pressure sensor is arranged, with the fluid inlet channel is effected via narrow gaps along the coil of the electromagnet. However, the available cross sections are very small in this instance so that the measuring results reflect reality only with a delay. Pressure losses also occur due to the small cross sections so that overall inaccurate measurements result.

In order to obtain measuring results as accurate as possible in real time, DE 10 2007 000 900 A1 describes providing openings at the fluid inlet channel that are connected with a pressure measuring chamber housing a pressure sensor. In this arrangement, the air flows towards the pressure sensor, i.e., the pressure detection surface is directly opposite the channel. This is supposed to allow for very exact pressure measurements, with the pressure detection accuracy being maintained even if a so-called impact or shock wave should appear at the fluid inlet. However, this kind of arrangement is disadvantageous in that, in particular, the fluid inlet requires considerable structural space, since the additional pressure detection space with the associated pressure sensor must be provided, respectively. The variability of such a valve with respect to the adaptation to different structural spaces is moreover very restricted, in particular with respect to the adaptation of the connector position. In controlling the valve, short pressure pulsations may cause a faulty control of the valve.

SUMMARY

An aspect of the present invention is to provide a valve device that supplies sufficiently exact measuring results, while being unsusceptible to short pressure pulsations and to condensate that occur in the exhaust gas flow and, at the same time, which requires as little structural space as possible. An additional aspect of the present invention is to provide a maximum variability with respect to electric connection.

In an embodiment, the present invention provides a valve device for an internal combustion engine which includes a drive unit. A drive housing in which the drive unit is arranged. A valve unit is configured to be moved by the drive unit. The valve unit comprises a valve rod and a valve closure member. A flow housing comprises a fluid inlet channel and a fluid outlet channel. A connection cross section of the fluid inlet channel and the fluid outlet channel is configured to be controlled by the valve closure member. A pressure detection chamber is fluidically connected with the fluid inlet channel. A pressure sensor is arranged in the pressure detection chamber and is integrated in the drive housing. The pressure sensor comprises a pressure detection surface arranged in a plane. A normal of the pressure detection surface is arranged so as to be perpendicular to a direction of a fluid flow into the pressure detection chamber. A valve device of this design is advantageous in that the provision of the pressure sensor requires almost no additional structural space, while it is possible to select the flow path to the pressure detection chamber to be so short that exact measuring results are obtained. It is nevertheless avoided that a pressure impulse directed towards the pressure detection surface causes a compromising of these measuring results. The position for attaching the pressure detection chamber with the pressure sensor on the circumference of the valve is largely optional so that the position of the associated connector can also be adapted to existing connectors and the given structural space. Due to the resulting parallelism of the sensor surface and the airflow, a deposition of condensate on the pressure sensor is avoided.

BRIEF DESCRIPTION OF THE DRAWINGS

The present invention is described in greater detail below on the basis of embodiments and of the drawings in which.

DETAILED DESCRIPTION

In an embodiment of the present invention, the pressure detection chamber can, for example, extend for at least 4 mm from the pressure detection surface in the direction of the normal to the pressure detection surface of the pressure sensor. Pressure peaks acting towards the pressure detection surface can thereby be attenuated so that faulty measurements resulting therefrom are minimized.

A considerable insensitivity to existing condensate is achieved when the pressure detection surface of the pressure sensor is surrounded by a surge barrier along its circumference.

Adaptation and exchangeability in the event of a malfunction of the drive unit is achieved by the fact that the drive housing comprises a flange surface for the fastening of the flow housing, which is arranged perpendicular to the direction of valve movement.

In an embodiment of the present invention, the pressure detection chamber can, for example, be connected with the fluid inlet channel via a connecting channel which in a further development is arranged perpendicular to the flange surface of the drive housing. The shortest connection to the fluid inlet channel is thus made. The structure is simple and economic to manufacture, due to the possible integration of the connecting channel in the drive housing. A distance to the fluid inlet channel, which serves to compensate for pressure peaks, is still maintained.

In a further development thereof, the pressure detection chamber and the connecting channel have a total volume of at least 15 mm$^3$. Short-term pressure variations can thus be compensated for without being detected by the pressure sensor as actual pressure changes in the system.

In an embodiment of the present invention, a lead frame can, for example, be injection molded into drive housing, through which the pressure sensor and an electromagnet of the drive unit are electrically connected to the connector. Further lines are thereby omitted. A disconnection of the electric contacts is prevented by the fixed position in the plastic material. The lead frame may also directly include the terminal pins of the connector.

In an embodiment of the present invention, the pressure detection chamber can, for example, be closed with a cover fastened to the drive housing. The pressure sensor can thus be checked for functionality and, if need be, replaced without having to disassemble the entire drive unit. Assembly is moreover simplified.

In this manner, a valve device is provided that only requires a small structural space while providing high measuring accuracy without time delay. Pressure peaks directed in the flow direction do not compromise the measuring results. A deposition of condensate on the pressure detection surface is largely avoided.

Figure 1:
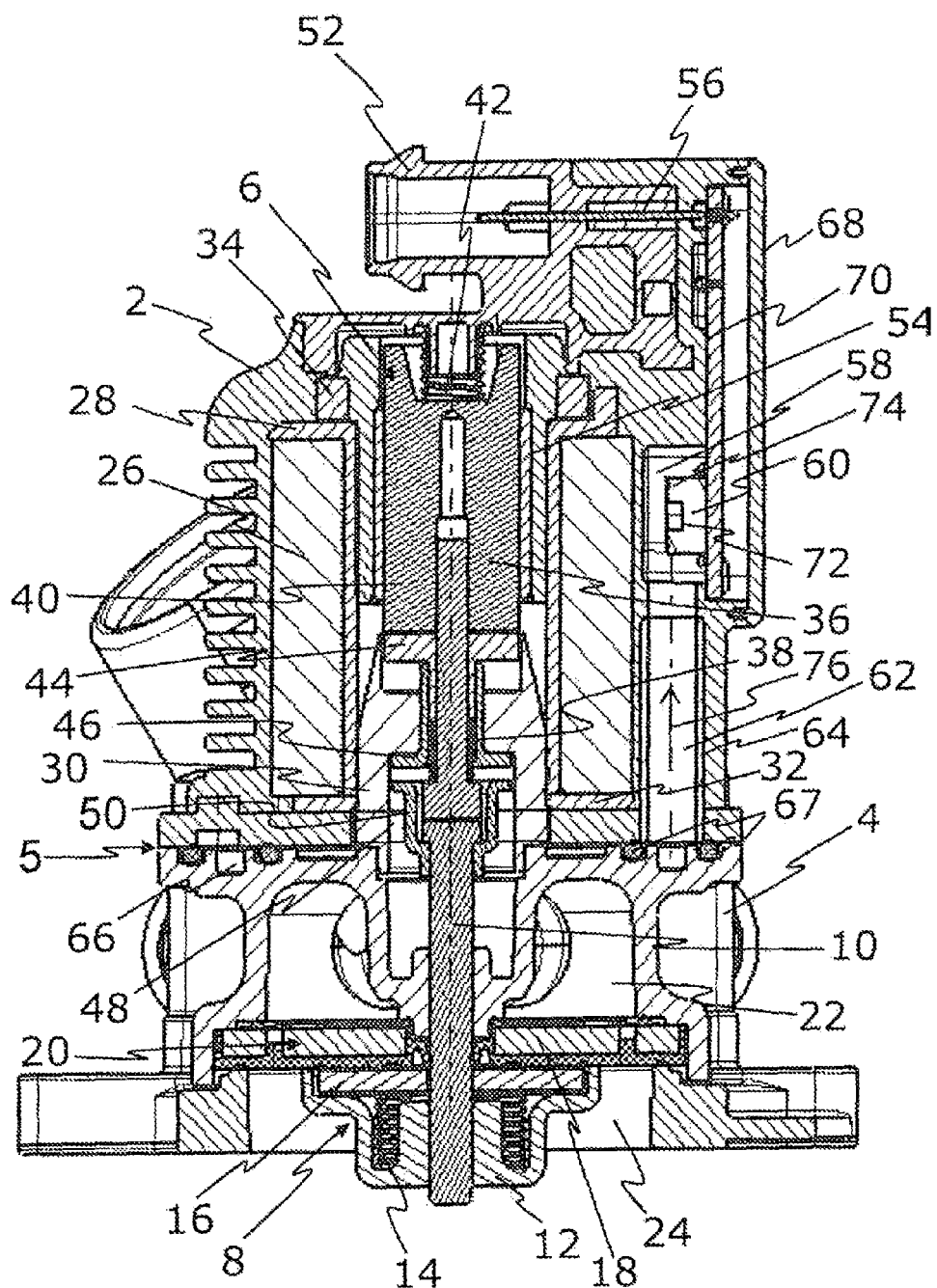
FIG. 1 shows a sectional side elevational view of a valve device according to the present invention.
Figure 2:
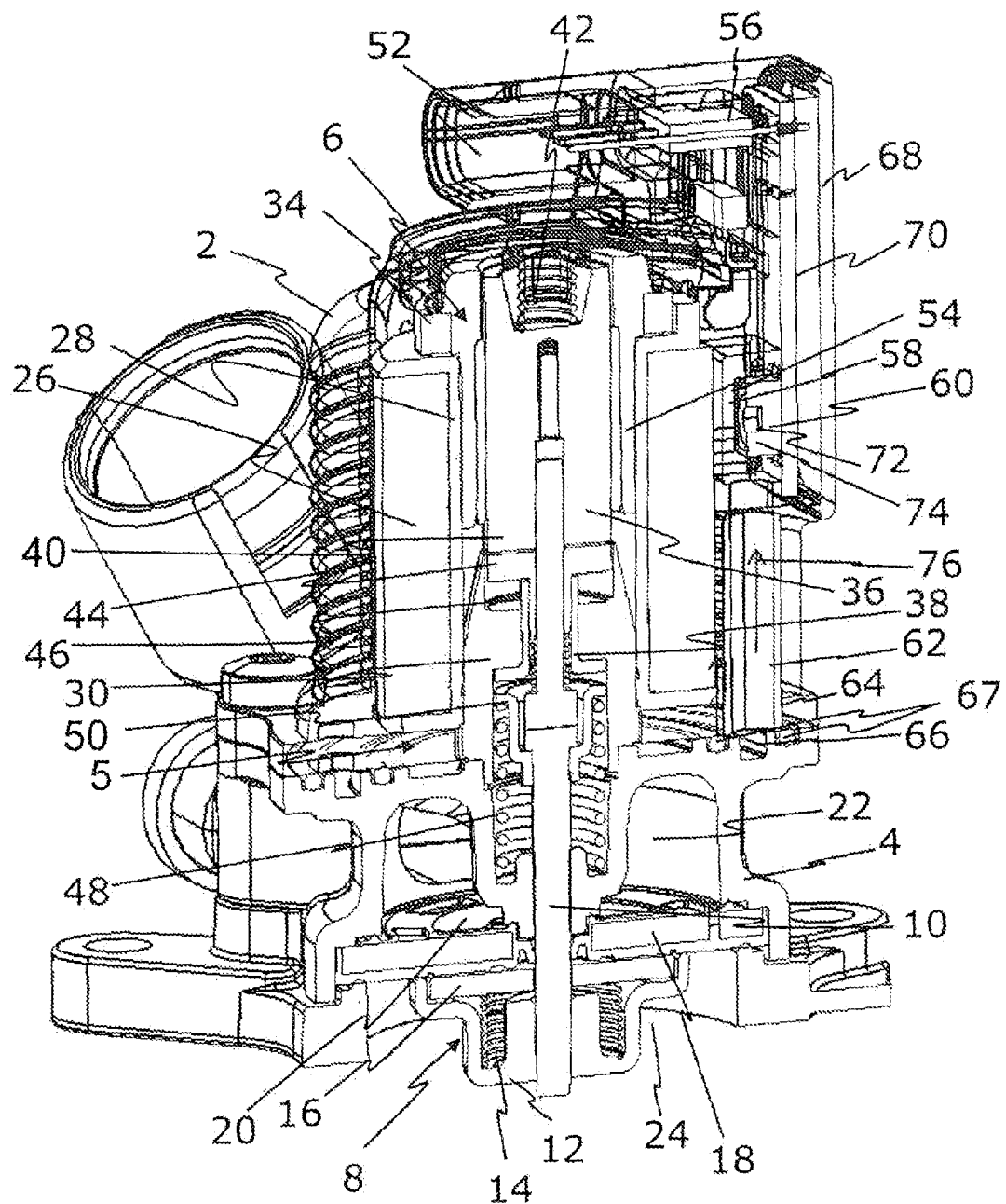
FIG. 2 shows a partly cut away and transparent three-dimensional view of the valve device of FIG. 1.

The valve device of the present invention illustrated in FIGS. 1 and 2 serve, for example, as a secondary air valve of an internal combustion engine. The secondary air valve comprises a drive housing 2 and a flow housing 4, which may each comprise several parts and are fastened to each other at a common flange surface 5.

The drive housing 2 comprises an electromagnetic drive unit 6 which is adapted to move a valve unit 8 in the axial direction. The valve unit 8 is formed by a bipartite valve rod 10 to which a first valve closure member 12 is fastened at the end averted from the drive unit 6. The first valve closure member 12 is designed as a hollow body in which a spring 14 is arranged, the first axial end of which contacts the closed side of the first valve closure member 12 and whose opposite axial end contacts a return plate 16 biased by the force of the spring 14 towards a valve seat plate 18 serving as a seat surface for the return plate 16. The valve seat plate 18 additionally serves as a seat surface for the first valve closure member 12 fully surrounding the circumference of the return plate 16 when in the closed state. Correspondingly, the valve set plate 18 has openings serving as a connecting cross section 20, through which a fluid inlet channel 22 can be connected with a fluid outlet channel 24, both of which are formed in the flow housing 4.

The electromagnetic drive unit 6 is formed by a coil 26 wound on a coil support 28, a core 30 fixed in the coil support 28, magnetic return plate 32 and a yoke 34. This arrangement cooperates with a multi-part armature 36 which is supported on the bipartite valve rod 10 through a spring 38 and is slidably received in a slide bush 54. The multi-part armature 36 is formed by a first armature element 40, biased towards the first valve closure member 12 by a second spring 42 supported on the drive housing 2 at the end remote from the first valve closure member 12, a second armature element 44 of significantly smaller axial dimension than the first armature element 40 and a non-magnetizable first coupling element 46 biased by the spring 38 against the second armature element 44. The bipartite valve rod 10 itself is biased towards the multi-part armature 36 by a third spring 48 and a second coupling element 50, the valve rod being slidably guided in the armature.

The drive housing 2 further comprises a connector 52 connected to an electronic control unit. For this purpose, a lead frame 56 is used through which the coil 26 is driven as well.

According to the present invention, a pressure detection chamber 58 is formed in the drive housing 2 which houses a pressure sensor 60 that may also be connected to the connector 52 via the lead frame 56. The pressure detection chamber 58 is fluidically connected to the fluid inlet channel 22 through a connecting channel 62 which in the present embodiment is defined by a pipe 64. As is evident from FIGS. 1 and 2, the flow housing 4 not only has an opening (not specifically illustrated) to the fluid inlet channel 22, but also a circumferential groove 66 in the common flange surface 5 that allows a variable arrangement of the flow housing 4 with respect to the drive housing 2 and a variable arrangement of the pressure detection chamber 58 with respect to the fluid inlet channel 22. For this purpose, the circumferential groove 66 is arranged at the same distance to the central axis of the valve as the pipe 64, and the pipe 64 or the connecting channel 62 also protrudes up to the common flange surface 5. Respective seal rings 67 are arranged radially inside and outside.

The pressure detection chamber 58 is arranged in projection of the connecting channel 62 arranged perpendicular to the common flange surface 5, and is closed with a cover 68. The pressure sensor 60 is provided on a circuit board 70 that includes the electronic control unit 54. The pressure sensor 60 has a pressure detection surface 72 circumferentially surrounded by a surge barrier 74 and whose normal is arranged, according to the present invention, perpendicularly to the flow direction 76 of the fluid into the pressure detection chamber 58 defined by the axis of the connecting channel 62. The pipe 64 has a diameter of about 4 mm. The diameter should at least be 2 mm. The distance from the pressure detection surface 72 in the direction of the normal to the next wall is about 5 mm and should be at least 4 mm. The total volume of the surge chamber, formed by the pressure detection chamber 58 and the connecting channel 62, should at least be 15 mm$^3$ to be able to compensate for pressure peaks.

This arrangement provides that fluid flowing into the pressure detection chamber 58 does not act immediately on the pressure sensor 60. The pressure sensor 60 does not pick up pressure pulsations acting in the flow direction, but only pressure changes acting in the chamber. It is also protected from inflowing condensate by the surge barrier 74.

A valve device according to the present invention operates as follows:

When the ECU detects too low a temperature of a catalytic converter, a secondary air pump is activated and the secondary air valve is driven. By supplying electric power, first, the second armature element 44 with the first coupling element 46 is moved against the spring 38, which generates high acceleration by which the first valve closure member 12 is detached from the valve seat plate 18, even if adhesion should exist. The further opening process is performed by the first armature element 40 also moving towards the first valve closure member 12. The pressure of the secondary air prevailing in the fluid inlet channel 22 opens the return plate 16 against the spring force of the spring 14, so that the connecting cross section 20 is cleared and secondary air can flow to the fluid outlet channel 24 and from there to a downstream exhaust gas pipe. In the event of exhaust gas pulsations occurring, the return plate 16 prevents the backflow of the exhaust gas from the exhaust gas pipe towards the secondary air pump.

The secondary air pressure prevailing in the fluid inlet channel 22 is always present at the pressure sensor 60 via the connecting channel 62 and allows for a monitoring of the secondary air supply which is independent of directed pressure impulses. It is further possible to have the pressure sensor 60 detect possible malfunctions of the secondary air pump and to transmit these malfunctions to a connected ECU.

In this manner, a reliable control and monitoring (OBD) of a secondary air valve is provided which is insensitive to trouble caused by directed pressure impulses or incidental condensate.

Various structural modifications of the secondary air valve are conceivable without leaving the scope of protection of the present invention.

The present invention is not limited to embodiments described herein; reference should be had to the appended claims.

What is claimed is:

1. A valve device for an internal combustion engine, the valve device comprising:
   a drive unit;
   a drive housing in which the drive unit is arranged;
   a valve unit configured to be moved by the drive unit, the valve unit comprising a valve rod and a valve closure member;
   a flow housing comprising a fluid inlet channel and a fluid outlet channel, a connection cross section of the fluid inlet channel and the fluid outlet channel being configured to be controlled by the valve closure member;
   a pressure detection chamber fluidically connected with the fluid inlet channel; and
   a pressure sensor arranged in the pressure detection chamber and integrated in the drive housing, the pressure sensor comprising a pressure detection surface arranged in a plane, a normal of the pressure detection surface being arranged so as to be perpendicular to a direction of a fluid flow across the entire pressure detection surface.

2. The valve device as recited in claim 1, wherein the pressure detection chamber extends in a direction of the normal on the pressure detection surface of the pressure sensor for at least 4 mm from the pressure detection surface.

3. The valve device as recited in claim 1, wherein the pressure detection surface comprises a surge barrier surrounding a circumference of the pressure detection surface.

4. The valve device as recited in claim 1, wherein the drive housing comprises a flange surface, the flange surface being configured to fasten the flow housing, the flange surface being arranged to be perpendicular to a direction of movement of the valve unit.

5. The valve device as recited in claim 4, further comprising a connecting channel, wherein the pressure detection chamber is fluidically connected with the fluid inlet channel through the connecting channel.

6. The valve device as recited in claim 5, wherein the connecting channel is arranged to be perpendicular to the flange surface.

7. The valve device as recited in claim 5, wherein the pressure detection chamber and the connecting channel have a total volume of at least 15 mm$^3$.

8. The valve device as recited in claim 1, further comprising a connector, wherein the drive housing includes a lead frame which is injection-molded in the drive housing, and a coil, wherein the pressure sensor and the coil of the drive unit are electrically connected to the connector.

9. The valve device as recited in claim 1, further comprising a cover fastened to the drive housing, wherein the pressure detection chamber is closed with the cover.

10. A valve device for an internal combustion engine, the valve device comprising:
    a drive unit;
    a drive housing in which the drive unit is arranged; a valve unit configured to be moved by the drive unit, the valve unit comprising a valve rod and a valve closure member;
    a flow housing comprising a fluid inlet channel and a fluid outlet channel, a connection cross section of the fluid inlet channel and the fluid outlet channel being configured to be controlled by the valve closure member;
    a pressure detection chamber fluidically connected with the fluid inlet channel; and a pressure sensor arranged in the pressure detection chamber and integrated in the drive housing, the pressure sensor comprising a pressure detection surface arranged in a plane, a normal of the pressure detection surface being arranged so as to be perpendicular to a direction of a fluid flow across the entire pressure detection surface,
    wherein, the fluid flow into the pressure detection chamber is independent of the control of the connection cross section by the valve closure member.

11. The valve device as recited in claim 10, wherein the pressure detection chamber extends in a direction of the normal on the pressure detection surface of the pressure sensor for at least 4 mm from the pressure detection surface.

12. The valve device as recited in claim 10, wherein the pressure detection surface comprises a surge barrier surrounding a circumference of the pressure detection surface.

13. The valve device as recited in claim 10, wherein the drive housing comprises a flange surface, the flange surface being configured to fasten the flow housing, the flange surface being arranged to be perpendicular to a direction of movement of the valve unit.

14. The valve device as recited in claim 13, further comprising a connecting channel, wherein the pressure detection chamber is fluidically connected with the fluid inlet channel through the connecting channel.

15. The valve device as recited in claim 14, wherein the connecting channel is arranged to be perpendicular to the flange surface.

16. The valve device as recited in claim 14, wherein the pressure detection chamber and the connecting channel have a total volume of at least 15 mm$^3$.

17. The valve device as recited in claim 10, further comprising a connector, wherein the drive housing includes a lead frame which is injection-molded in the drive housing, and a coil, wherein the pressure sensor and the coil of the drive unit are electrically connected to the connector.

18. The valve device as recited in claim 10, further comprising a cover fastened to the drive housing, wherein the pressure detection chamber is closed with the cover.

* * * * *